US011232211B2

United States Patent
Zhang (10) Patent No.: US 11,232,211 B2
(45) Date of Patent: Jan. 25, 2022

(54) METHOD, APPARATUS AND DEVICE FOR SHARING PASSWORD BETWEEN BIOS AND OPERATING SYSTEM

(71) Applicant: ZHENGZHOU YUNHAI INFORMATION TECHNOLOGY CO., LTD., Henan (CN)

(72) Inventor: Binghui Zhang, Henan (CN)

(73) Assignee: ZHENGZHOU YUNHAI INFORMATION TECHNOLOGY CO., LTD., Henan (CN)

( * ) Notice: Subject to any disclaimer, the term of this patent is extended or adjusted under 35 U.S.C. 154(b) by 351 days.

(21) Appl. No.: 16/493,284

(22) PCT Filed: Dec. 26, 2018

(86) PCT No.: PCT/CN2018/123675
§ 371 (c)(1),
(2) Date: Sep. 11, 2019

(87) PCT Pub. No.: WO2020/000953
PCT Pub. Date: Jan. 2, 2020

(65) Prior Publication Data
US 2021/0365560 A1 Nov. 25, 2021

(30) Foreign Application Priority Data
Jun. 29, 2018 (CN) .......................... 201810700195.9

(51) Int. Cl.
*G06F 21/57* (2013.01)
*G06F 21/78* (2013.01)
(Continued)

(52) U.S. Cl.
CPC ............ *G06F 21/575* (2013.01); *G06F 21/31* (2013.01); *G06F 21/44* (2013.01); *G06F 21/78* (2013.01)

(58) Field of Classification Search
CPC ........ G06F 21/575; G06F 21/31; G06F 21/44; G06F 21/78
See application file for complete search history.

(56) References Cited

U.S. PATENT DOCUMENTS

2007/0005951 A1 1/2007 Davis et al.
2007/0050632 A1* 3/2007 Matsuoka ............... G06F 21/31
713/182

(Continued)

FOREIGN PATENT DOCUMENTS

CN 1892598 A 1/2007
CN 102037442 A 4/2011

(Continued)

OTHER PUBLICATIONS

First Office Action dated Mar. 3, 2021 for Chinese patent application No. 201810700195.9, English translation provided by Global Dossier.

(Continued)

*Primary Examiner* — Zahid Choudhury
(74) *Attorney, Agent, or Firm* — Yue (Robert) Xu; Apex Attorneys at Law, LLP (57) ABSTRACT

A method, an apparatus and a device for sharing a password between a BIOS and an operating system are provided, which are applied to a Legacy boot mode. In the method, a user is prompted to input a password of the BIOS. The password inputted by the logon user is received and verified. The verified password is stored in a predetermined target memory and E820H information is created if the received password is verified as correct, where address data in the E820H information points to an address of the target memory. The address of the target memory is determined based on the created E820H information and memory contents are obtained if a password is set for the operating (Continued)

system. The logon user is permitted to log on the operating system if the acquired memory contents are verified as correct.

16 Claims, 2 Drawing Sheets

(51) Int. Cl.
*G06F 21/31* (2013.01)
*G06F 21/44* (2013.01)

(56) References Cited

U.S. PATENT DOCUMENTS

| | | | | |
|---|---|---|---|---|
| 2007/0061587 | A1* | 3/2007 | Kim | G06F 21/35 |
| | | | | 713/182 |
| 2008/0052777 | A1* | 2/2008 | Kawano | H04L 9/088 |
| | | | | 726/18 |
| 2008/0077986 | A1* | 3/2008 | Rivera | G06F 21/34 |
| | | | | 726/20 |
| 2011/0072511 | A1 | 3/2011 | Gillespie | |
| 2013/0174250 | A1 | 7/2013 | Chen | |
| 2014/0173714 | A1* | 6/2014 | Nakao | G06F 21/31 |
| | | | | 726/16 |
| 2017/0185782 | A1* | 6/2017 | Furuya | G06F 21/575 |

FOREIGN PATENT DOCUMENTS

| | | | | |
|---|---|---|---|---|
| CN | 103186748 | A * | 7/2013 | ........... G06F 21/572 |
| CN | 103186748 | A | 7/2013 | |
| CN | 103812641 | A | 5/2014 | |
| CN | 104636658 | A | 5/2015 | |
| CN | 107770151 | A | 3/2018 | |
| CN | 108200050 | A | 6/2018 | |
| CN | 108959912 | A | 12/2018 | |
| EP | 2080148 | A2 | 7/2009 | |
| WO | 2008108819 | A2 | 9/2008 | |

OTHER PUBLICATIONS

International Search Report for PCT/CN2018/123675 dated Apr. 8, 2019, ISA/CN.

* cited by examiner

METHOD, APPARATUS AND DEVICE FOR SHARING PASSWORD BETWEEN BIOS AND OPERATING SYSTEM

The present application is a national phase application of PCT international patent application PCT/CN2018/123675, filed on Dec. 26, 2018 which claims priority to Chinese Patent Application No. 201810700195.9, titled "METHOD, APPARATUS AND DEVICE FOR SHARING PASSWORD BETWEEN BIOS AND OPERATING SYSTEM", filed on Jun. 29, 2018 with the Chinese Patent Office, both of which are incorporated herein by reference in their entireties its entirety.

FIELD

The present disclosure relates to the field of computer technology, and in particular to a method, an apparatus and a device for sharing a password between a BIOS and an operating system.

BACKGROUND

At present, computer users require higher and higher data security. In order to enhance the data security, a user generally set a password for a basic input output system (BIOS) and a logon password for an operating system. Further, users require better and better user experiences. However, since both the password for the BIOS and the logon password for the operating system are set, both passwords are required to be inputted each time when performing logon, which is tiresome, resulting in a poor user experience. Furthermore, in most cases, the password for the BIOS is identical to the logon password for the operating system, which more likely make the user feel tiresome.

In summary, it is desired to improve the user experience of inputting the password while the data security is ensured.

SUMMARY

A method for sharing a password between a BIOS and an operating system is provided. The method is applied to a Legacy boot mode and includes: prompting a logon user to input a password of the BIOS if it is detected in a process of power-on self-test that a password is set for the basic input output system BIOS; receiving the password of the BIOS inputted by the logon user, and verifying the received password of the BIOS; storing the verified password of the BIOS in a predetermined target memory and creating E820H information in a case that the received password of the BIOS is verified as correct, where address data in the E820H information points to an address of the target memory; determining the address of the target memory based on the created E820H information and acquiring memory contents stored in the target memory, if it is detected that a password is set for the operating system; and permitting the logon user to log on the operating system in a case that the acquired memory contents are verified as correct.

An apparatus for sharing a password between a BIOS and an operating system is provided. The apparatus is applied to a Legacy boot mode and includes a password inputting module, a first verifying module, a configuration table creating module, a memory content acquiring module and a second verifying module. The password inputting module is configured to prompt a logon user to input a password of the BIOS if it is detected in a process of power-on self-test that a password is set for the basic input output system (BIOS). The first verifying module is configured to receive the password of the BIOS inputted by the logon user and verify the received password of the BIOS. The configuration table creating module is configured to store the verified password of the BIOS in a predetermined target memory and create E820H information in a case that the received password of the BIOS is verified as correct. Address data in the E820H information points to an address of the target memory. The memory content acquiring module is configured to determine the address of the target memory based on the created E820H information and acquire memory contents stored in the target memory, if it is detected that a password is set for the operating system. The second verifying module is configured to permit the logon user to log on the operating system in a case that the acquired memory contents are verified as correct.

A device for sharing a password between a BIOS and an operating system is provided. The device includes a memory and a processor. The memory is configured to store programs for sharing a password between the BIOS and the operating system. The processor is configured to execute the programs for sharing a password between a BIOS and an operating system to perform the method for sharing a password between a BIOS and an operating system.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION OF EMBODIMENTS

The present disclosure aims to provide a method for sharing a password between a BIOS and an operating system, so as to improve user experience of inputting the password while the data security is ensured.

For a better understanding of the technical solutions of the present disclosure by those skilled in the art, the technical solutions of the present disclosure are described in detail with reference to the drawings and specific embodiments of the present disclosure. It is apparent that the embodiments described herein are only some rather than all of embodiments of the present disclosure. Based on the embodiments of the present disclosure, all other embodiments obtained by those skilled in the art without any creative work should fall within the protection scope of the present disclosure.

Figure 1:
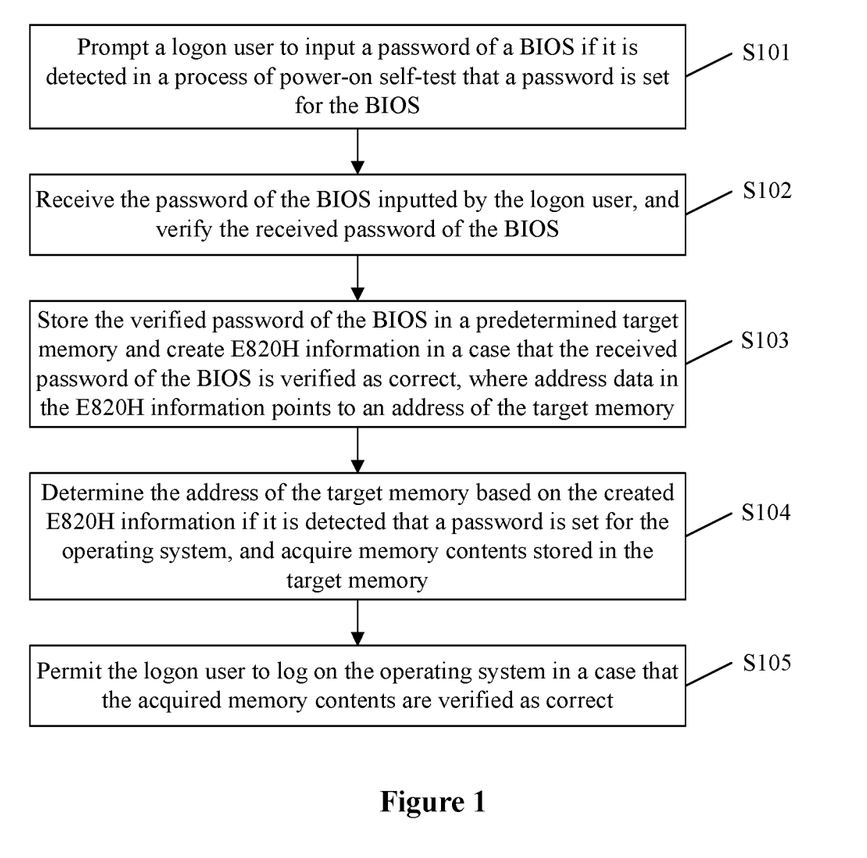
FIG. 1 is a schematic flowchart of a method for sharing a password between a BIOS and an operating system according to the present disclosure.

Reference is made to FIG. 1, which is a schematic flowchart of a method for sharing a password between a BIOS and an operating system according to the present disclosure. The method is applied to a Legacy boot mode and may include the following steps S101 to S105.

In S101, a logon user is prompted to input a password of the BIOS if it is detected in a process of power-on self-test that a password is set for the basic input output system (BIOS).

Generally, the technical solutions of the present disclosure may be used in a device based on Intel processor framework, such as a server and a notebook computer that are based on Intel processor framework.

After a hardware device, such as a server, is powered on, the server may perform a process of power-on self-test (POST). In the process of power-on self-test, it is detected whether a password is set for the BIOS. If it is detected that a password is set for the BIOS, the logon user is prompted to input the password of the BIOS. An interface for inputting the password may be provided through a display, so that the logon user inputs the password of the BIOS.

In S102, the password of the BIOS inputted by the logon user is received, and the received password of the BIOS is verified.

The password of the BIOS is received after being inputted by the logon user. Then the received password of the BIOS is verified. The received password of the BIOS may be compared with a correct password of the BIOS. If the received password of the BIOS is identical to the correct password of the BIOS, it is indicated that the password of the BIOS inputted by the logon user is correct, that is, the verification is successful. Otherwise, the verification is failed.

In addition, in practices, the received password may be verified for different types of logon users. For example, the logon users may be classified into ordinary users and administrators having high authority. For example, an ordinary user 1, an ordinary user 2, an ordinary user 3, an administrator 1 and an administrator 2 can log on the BIOS. Passwords respectively corresponding to the ordinary user 1, the ordinary user 2, the ordinary user 3, the administrator 1 and the administrator 2 are set for the BIOS. In a case that a logon user intending to log on the BIOS inputs a password of the BIOS and selects a type of ordinary user, the password of the BIOS inputted by this logon user may be compared with passwords in a BIOS password library for ordinary users. Options of user types may be provided to the logon user on a display interface. For example, five options are provided, namely, an ordinary user 1, an ordinary user 2, an ordinary user 3, an administrator 1 and an administrator 2. In these embodiments, the BIOS password library for ordinary users may store three passwords, that is, passwords that are set in advance by the ordinary user 1, the ordinary user 2, and the ordinary user 3 respectively. If it is verified that the password of the BIOS inputted by this logon user is identical to one of the three passwords, it is determined that the password of the BIOS inputted by this logon user is correct, that is, the verification is successful. There may be other ways to verify the password of the BIOS inputted by the logon user, which are not limited by the present disclosure. For example, after the logon user selects the administrator 1 and inputs a password of the BIOS, the inputted password may be compared with a preset password corresponding to the administrator 1. If the inputted password is identical to the preset password corresponding to the administrator 1, it is indicated that the inputted password is correct.

In S103, in a case that the received password of the BIOS is verified as correct, the verified password of the BIOS is stored in a predetermined target memory, and E820H information is created. Address data in the E820H information points to an address of the target memory.

It should be noted that, generally in a case that the received password of the BIOS is verified as incorrect, the interface for inputting the password of the BIOS may be displayed continuously. That is, the logon user is generally allowed to re-input the password of the BIOS.

In a case that the received password of the BIOS is verified as correct, the BIOS may store the verified password of the BIOS in the predetermined target memory, and creates the E820H information. The address data in the E820H information points to the address of the target memory. The target memory may be reserved in a memory space. A size of the target memory and a specific address of the target memory in the memory space may be set and adjusted based on actual situations, which is not limited in the present disclosure.

The BIOS stores the verified password of the BIOS in the target memory, and creates the E820H information corresponding to the password of the BIOS. When the E820H information is created, the address data in the E820H information points to the address of the target memory. That is, the E820H information is created by taking the address of the target memory as contents of the address data in the E820H information, such that the address of the target memory can be determined based on the E820H information in a subsequent step.

In S104, if it is detected that a password is set for the operating system, the address of the target memory is determined based on the created E820H information, and memory contents stored in the target memory are acquired.

After step S103, it may be detected whether a password is set for the operating system. If it is detected that no password is set for the operating system, the logon user is permitted to log on the operating system. It should be noted that, steps S101 to S103 are performed in the case that a password is set for the BIOS. In the process of the power-on self-test, it may be detected whether a password is set for the BIOS. If it is detected that no password is set for the BIOS, the BIOS may be directly started, and then it may be detected whether a password is set for the operating system.

If it is detected that a password is set for the operating system, the address of the target memory is determined based on the E820H information, and the memory contents stored in the target memory are acquired. The operating system may access the E820H information created by the BIOS following rules of the Legacy boot mode, so as to determine the address of the target memory. After the address of the target memory is determined, the memory contents stored in the target memory are acquired. When step S103 is performed, the verified password of the BIOS is stored in the target memory, so that the memory contents include the password of the BIOS. However, in practices, the memory contents may further include other data. That is, besides the password of the BIOS, the target memory may store other data. For example, the memory contents may further include a flag bit corresponding to the password of the BIOS.

The technical solutions of the present disclosure are applied to the Legacy boot mode and the Legacy boot mode supports interrupt processing. Further, the Advanced Configuration and Power Interface (ACPI) specification defines INT15 E820H for acquiring an address descriptor mapping to a memory of the system, which is often used by the operating system to acquire a size of the memory. Therefore, in practices, the operating system may acquire the address data in the E820H information by triggering the INT15 E820H interrupt, and determine the address of the target memory based on the address data.

In S105, the logon user is permitted to log on the operating system in a case that the acquired memory contents are verified as correct.

After the memory contents stored in the target memory are acquired, it is determined whether the acquired memory contents are correct. If the acquired memory contents are verified as correct, the logon user is permitted to log on the operating system. In an embodiment, the memory contents may include the password of the BIOS only. That is, the verified password of the BIOS stored in the target memory in step S103 is verified after the memory contents are acquired. For example, the acquired password of the BIOS is compared with a preset correct password of the operating system. In a case that the acquired password of the BIOS is identical to the preset correct password of the operating system, it is determined that the memory contents are correct, and the logon user is permitted to log on the operating system. The verification in step S105 may be performed based on different types of logon users as described in step S102, which is not repeated herein.

It should be noted that, in a case that the user set both a password for the BIOS and a password of the operating system, the password of the BIOS is generally identical to the password of the operating system. Therefore, the technical solutions of the present disclosure are generally applicable to the case the password preset for the BIOS is identical to the password preset for the operating system. In a case that the acquired memory contents are verified as incorrect, the interface for inputting the password of the BIOS may be displayed continuously.

The method according to the embodiment of the present disclosure is applied to the Legacy boot mode and include: prompting the logon user to input the password of the BIOS if it is detected in a process of power-on self-test that a password is set for the BIOS; receiving the password of the BIOS inputted by the logon user, and verifying the received password of the BIOS; storing the verified password of the BIOS in a predetermined target memory and creating E820H information in a case that the received password of the BIOS is verified as correct, where address data in the E820H information points to an address of the target memory; determining the address of the target memory based on the created E820H information and acquiring memory contents stored in the target memory, if it is detected that a password is set for the operating system; and permitting the logon user to log on the operating system in a case that the acquired memory contents are verified as correct.

In the technical solutions of the present disclosure, a correct password of the BIOS is inputted by the logon user and then is verified. The verified password of the BIOS is stored in the predetermined target memory, and the E820H information corresponding to the verified password of the BIOS is created. If it is detected that a password is set for the operating system, since the address data in the E820H information points to the address of the target memory, the address of the target memory can be determined based on the E820H information, such that the memory contents including the password of the BIOS in the target memory can be acquired. After the memory contents stored in the target memory are verified as correct, the logon user is permitted to log on the operating system. That is, in the technical solutions of the present disclosure, for the Legacy boot mode, the password of the BIOS and the password of the operating system are both set, thereby ensuring the data security. The logon user can log on the operating system by inputting only the password of the BIOS. Therefore, with the technical solutions of the present disclosure, user experience of inputting the password can be improved while the data security is ensured.

In an embodiment of the present disclosure, the storing the verified password of the BIOS in the predetermined target memory in step 103 includes: storing the verified password of the BIOS in the predetermined target memory, and storing a flag bit corresponding to the verified password of the BIOS in the predetermined target memory. Accordingly, the acquiring the memory contents stored in the target memory is step 104 includes: acquiring the password of the BIOS and the flag bit that are stored in the target memory.

In this embodiment, the flag bit corresponding to the verified password of the BIOS is also stored when storing the password of the BIOS. That is, in this embodiment, the memory contents include the verified password of the BIOS and the flag bit that are stored in the target memory. Compared with the password of the BIOS, the flag bit is generally simpler in data structure and smaller in size. It is easier to parse, read and write the flag bit than the password of the BIOS. For example, if the ordinary user 1 sets a password "abcdefg" for the BIOS, a flag bit corresponding to the password of the BIOS may be set as, for example, 001, to substitute for the password of the BIOS. Accordingly, in this embodiment, when acquiring the memory contents stored in the target memory, both the password "abcdefg" of the BIOS and the flag bit 001 are acquired.

In an embodiment that the flag bit is set, in step S105, the logon user is permitted to log on the operating system in a case that the acquired flag bit is verified as correct.

It should be noted that, the verifying the acquired memory contents in step 105 is not limited to verifying memory content as correct only when all data in the memory contents is correct. In an embodiment that the memory contents include both the password of the BIOS and the flag bit, in a case that only the flag bit is verified as correct, it is determined that the memory contents are correct, so that the logon user is permitted to log on the operating system. That is, in the technical solutions of the present disclosure, a criterion used to determine whether the memory contents are correct or not is not limited. The criterion may be set and adjusted based on actual situations, which is not limited in the present disclosure. For example, in this embodiment, in a case that the flag bit is verified as correct, the memory content is determined as correct, and the logon user is permitted to log on the operating system.

The flag bit is in one-to-one correspondence with the password of the BIOS, such that the flag bit substitutes for the corresponding password of the BIOS. For example, the ordinary user 1 sets a password "abcdefg" for the BIOS, the ordinary user 2 sets a password "gfedcba" for the BIOS, the ordinary user 3 sets a password "hijklmn" for the BIOS, and flag bits corresponding to the three passwords may be set to 001, 010 and 011 respectively. In this way, the three flag bits may substitute for the three passwords respectively, so as to distinguish the different logon users. In this embodiment, when performing step S105, the flag bit, instead of the password of the BIOS, in the memory contents is verified. For example, the password "abcdefg" of the BIOS and the flag bit 001 are acquired in step S104, and the flag bit 001 is verified. For example, the flag bit 001 may be compared with flag bits in a predetermined flag bit library. For example, the predetermined flag bit library may include flag bits 001, 010, 011 and 101, which represent the ordinary user 1, the ordinary user 2, the ordinary user 3, and the administrator 1 respectively. If it is verified that the acquired flag bit 001 is identical to one of the flag bits in the predetermined flag bit library, it is determined that the acquired flag bit 001 is correct, and the logon user is permitted to log on the operating system. In practices, the flag bit may also be verified for different logon users. For example, in a case that the flag bit 001 is acquired in step S105, and the logon user selects the ordinary user 1 when inputting the password of the BIOS, the flag bit 001 may be compared with a flag bit in the flag bit library corresponding to the ordinary user 1. If the flag bit 001 is identical to the flag bit in the flag bit library corresponding to the ordinary user 1, the verification is successful, and the logon user is permitted to log on the operating system.

In some embodiments that the flag bit is set, the flag bit and the acquired password of the BIOS may be both verified in step S105. That is, step S105 may include: permitting the logon user to log on the operating system in a case that both the acquired password of the BIOS and the flag bit are verified as correct. Since the flag bit is simple in data structure, data security may be reduced when an error occurs in the flag bit during data transmission and data parsing. For example, the logon user inputs the password of the BIOS corresponding to the ordinary user 1, and the password of the BIOS and the corresponding flag bit 001 are stored in the target memory. It is assumed the acquired flag bit is changed to 101 due to an error in the data transmission when the operating system acquires the flag bit. Further, a flag bit 101 is stored in the flag bit library and corresponds to the administrator 1. In this case, the operating system verifies the acquired flag bit 101 as correct because the flag bit 101 is stored in the flag bit library, so that the logon user is permitted to log on the operating system as the administrator 1. In view of this risk, both the acquired password of the BIOS and the acquired flag bit that are stored in the target memory are verified in a case that a high data security is required, to reduce a probability of error logon and improve the data security.

In an embodiment of the present disclosure, the storing the verified password of the BIOS in the predetermined target memory in step S103 includes: storing the verified password of the BIOS in the predetermined target memory based on a predetermined data structure. Accordingly, the acquiring the memory contents stored in the target memory in step S104 includes: acquiring the memory contents stored in the target memory by parsing data in the target memory based on the data structure.

For reading and writing the data in the target memory, the data structure may be pre-defined by a user, such that the data is stored in the target memory based on the data structure, thereby improving the data security. For example, the password of the BIOS and the flag bit are stored based on the pre-defined data structure. Accordingly, the data in the target memory are parsed based on the data structure when being acquired, so as to obtain the memory contents stored in the target memory.

In an embodiment of the present disclosure, after detecting that a password is set for the operating system in step 104 and before determining the address of the target memory based on the created E820H information and acquiring memory contents stored in the target memory in step S104, the method further includes a step of determining whether the password set for the operating system is identical to the password set for the BIOS. In a case of positive determination, the steps of determining the address of the target memory based on the created E820H information and acquiring memory contents stored in the target memory are performed.

The technical solutions of the present disclosure are generally applied to a case that the password set for the operating system is identical to the password set for the BIOS. However, in a few cases, the password of the operating system may be set to be different from the password of the BIOS according to requirements of the data security and user needs. This embodiment of the present disclosure is described for these cases. After it is detected that a password is set for the operating system in step S104, it is determined whether the password set for the operating system is identical to the password set for the BIOS. If it is determined that the password set for the operating system is identical to the password set for the BIOS, the following operations in step S104 are performed. If it is determined that the password set for the operating system is different from the password set for the BIOS, the logon user may be prompted to input a password of the operating system, so that the password of the operating system inputted by the logon user is compared with the password set for the operating system, to perform the verification, so as to determine whether to permit the logon user to log on the operating system.

Corresponding to the above method, an apparatus for sharing a password between a BIOS and an operating system is further provided according to an embodiment of the present disclosure. The embodiments of the method and the apparatus for sharing a password between a BIOS and an operating system can be referred to each other.

Figure 2:
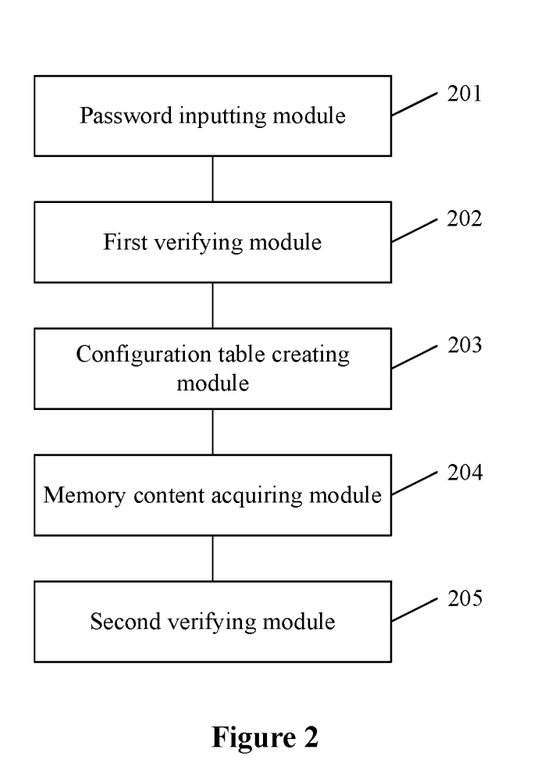
FIG. 2 is a schematic structural diagram of an apparatus for sharing a password between a BIOS and an operating system according to the present disclosure.

Reference is made to FIG. 2, which is a schematic structural diagram of an apparatus for sharing a password between a BIOS and an operating system according to the present disclosure. The apparatus is applied to a Legacy boot mode and includes a password inputting module 201, a first verifying module 202, a configuration table creating module 203, a memory content acquiring module 204 and a second verifying module 205.

The password inputting module 201 is configured to prompt a logon user to input a password of the BIOS if it is detected in a process of power-on self-test that a password is set for the basic input output system (BIOS).

The first verifying module 202 is configured to receive the password of the BIOS inputted by the logon user and verify the received password of the BIOS.

The configuration table creating module 203 is configured to store the verified password of the BIOS in a predetermined target memory and create E820H information in a case that the received password of the BIOS is verified as correct. Address data in the E820H information points to an address of the target memory.

The memory content acquiring module 204 is configured to determine the address of the target memory based on the created E820H information and acquire memory contents stored in the target memory if it is detected that a password is set for the operating system.

The second verifying module 205 is configured to permit the logon user to log on the operating system in a case that the acquired memory contents are verified as correct.

In an embodiment of the present disclosure, the configuration table creating module 203 is configured to, in a case that the received password of the BIOS is verified as correct, store the verified password of the BIOS in the predetermined target memory, store a flag bit corresponding to the verified password of the BIOS in the predetermined target memory, and create the E820H information. The address data in the E820H information points to an address of the target memory. The memory content acquiring module 204 is configured to, if it is detected that a password is set for the operating system, determine the address of the target memory based on the created E820H information and acquire the password of the BIOS and the flag bit that are stored in the target memory.

In an embodiment of the present disclosure, the second verifying module 205 is configured to permit the logon user to log on the operating system in a case that the acquired flag bit is verified as correct.

In an embodiment of the present disclosure, the second verifying module 205 is configured to permit the logon user to log on the operating system in a case that both the acquired password of the BIOS and the acquired flag bit that are stored in the target memory are verified as correct.

In an embodiment of the present disclosure, the configuration table creating module 203 is configured to, in a case that the received password of the BIOS is verified as correct, store the verified password of the BIOS in the predetermined target memory based on a predetermined data structure, and create the E820H information. The address data in the E820H information points to an address of the target memory. The memory content acquiring module 204 is configured to, if it is detected that a password is set for the operating system, determine the address of the target memory based on the created E820H information and acquire the memory contents stored in the target memory by parsing data in the target memory based on the data structure.

In an embodiment of the present disclosure, the memory content acquiring module 204 is configured to, if it is detected that a password is set for the operating system, acquire the address data in the E820H information by triggering INT15 E820H interrupt, determine the address of the target memory based on the address data, and acquire the memory contents stored in the target memory.

In an embodiment of the present disclosure, the apparatus further includes a password mode converting module. The password mode converting module is configured to determine whether the password set for the operating system is identical to the password set for the BIOS, and trigger the memory content acquiring module 204 to determine the address of the target memory based on the created E820H information and acquire memory contents stored in the target memory if it is determined that the password set for the operating system is identical to the password set for the BIOS.

Figure 3:
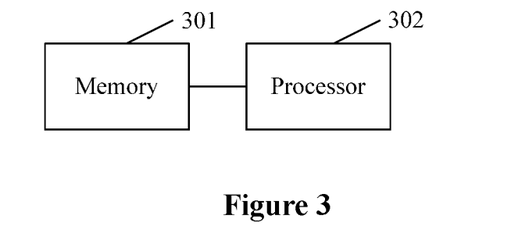
FIG. 3 is a schematic structural diagram of a device for sharing a password between a BIOS and an operating system according to the present disclosure.

Corresponding to the above method and apparatus, a device for sharing a password between a BIOS and an operating system is further provided according to an embodiment of the present disclosure. The embodiments of the method, apparatus and device for sharing a password between a BIOS and an operating system can be referred to each other. Reference is made to FIG. 3, which is a schematic structural diagram of a device for sharing a password between a BIOS and an operating system according to the present disclosure. The device includes a memory 301 and a processor 302. The memory 301 is configured to store programs for sharing a password between a BIOS and an operating system. The processor 302 is configured to execute the programs to perform the method for sharing a password between a BIOS and an operating system described in any one of the above embodiments.

It should be further noted that the relationship terminologies such as first, second or the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including a series of elements includes not only the elements but also other elements that are not enumerated, or also includes the elements inherent to the process, method, article or device. Unless expressively limited otherwise, the statement "comprising (including) one . . . " does not exclude the case that other similar elements may exist in the process, method, article or device.

The embodiments in this specification are described in a progressive way, each of which emphasizes the differences from others, and the embodiments can be referred to each other for the same or similar parts. Since the apparatus and the device disclosed in the embodiments correspond to the method therein, the description thereof is relatively simple, and for relevant matters references may be made to the description of the method.

Those skilled in the art should further understand that units and steps described with reference to the embodiments may be implemented by electronic hardware, computer software or a combination thereof. In order to clearly describe interchangeability between the hardware and the software, the units are generally described above in terms of functions. Whether the functions are realized by the hardware or the software is determined by specific applications of the technical solutions and design constraints. For different applications, those skilled in the art may adopt different implementations to realize the functions described above, and the implementations should fall within the scope of the present disclosure.

Specific examples are used herein to explain the principle and embodiments of the present disclosure, and the above description of the embodiments is only used to facilitate understanding of the technical solutions and core concept of the present disclosure. It should be pointed out that for those skilled in the art, various improvements and modifications can be made without departing from the principle of the present disclosure, and these improvements and modifications should fall within the scope of protection of the present disclosure.

The invention claimed is:

1. A method for sharing a password between a basic input output system (BIOS) and an operating system, the method applied to a Legacy boot mode and comprising:
   prompting a logon user to input a password of the BIOS if it is detected in a process of power-on self-test that a password is set for the BIOS;
   receiving the password of the BIOS inputted by the logon user, and verifying the received password of the BIOS;
   storing the verified password of the BIOS in a predetermined target memory and creating E820H information in a case that the received password of the BIOS is verified as correct, wherein address data in the E820H information points to an address of the target memory;
   determining the address of the target memory based on the created E820H information and acquiring memory contents stored in the target memory, if it is detected that a password is set for the operating system; and
   permitting the logon user to log on the operating system in a case that the acquired memory contents are verified as correct.

2. The method for sharing a password between a BIOS and an operating system according to claim 1, wherein
   the storing the verified password of the BIOS in a predetermined target memory comprises:
      storing the verified password of the BIOS in the predetermined target memory, and storing a flag bit corresponding to the verified password of the BIOS in the predetermined target memory; and the acquiring memory contents stored in the target memory comprises:

acquiring the password of the BIOS and the flag bit that are stored in the target memory.

3. The method for sharing a password between a BIOS and an operating system according to claim 2, wherein the permitting the logon user to log on the operating system in a case that the acquired memory contents are verified as correct comprises:

permitting the logon user to log on the operating system in a case that the acquired flag bit is verified as correct.

4. The method for sharing a password between a BIOS and an operating system according to claim 2, wherein the permitting the logon user to log on the operating system in a case that the acquired memory contents are verified as correct comprises:

permitting the logon user to log on the operating system in a case that both the acquired password of the BIOS and the acquired flag bit that are stored in the target memory are verified as correct.

5. The method for sharing a password between a BIOS and an operating system according to claim 1, wherein the storing the verified password of the BIOS in a predetermined target memory comprises:

storing the verified password of the BIOS in the predetermined target memory based on a predetermined data structure; and the acquiring memory contents stored in the target memory comprises:

acquiring the memory contents stored in the target memory by parsing data in the target memory based on the predetermined data structure.

6. The method for sharing a password between a BIOS and an operating system according to claim 1, wherein the determining the address of the target memory based on the created E820H information comprises:

acquiring the address data in the E820H information by triggering INT15 E820H interrupt, and determining the address of the target memory based on the address data.

7. The method for sharing a password between a BIOS and an operating system according to claim 1, wherein after it is detected that a password is set for the operating system, and before the determining the address of the target memory based on the created E820H information and acquiring memory contents stored in the target memory, the method further comprises:

determining whether the password set for the operating system is identical to the password set for the BIOS, wherein the determining the address of the target memory based on the created E820H information and acquiring memory contents stored in the target memory is performed if it is determined that the password set for the operating system is identical to the password set for the BIOS.

8. An apparatus for sharing a password between a basic input output system (BIOS) and an operating system, the apparatus applied to a Legacy boot mode and comprising:

a password inputting module configured to prompt a logon user to input a password of the BIOS if it is detected in a process of power-on self-test that a password is set for the BIOS;

a first verifying module configured to receive the password of the BIOS inputted by the logon user and verify the received password of the BIOS;

a configuration table creating module configured to store the verified password of the BIOS in a predetermined target memory and create E820H information in a case that the received password of the BIOS is verified as correct, wherein address data in the E820H information points to an address of the target memory;

a memory content acquiring module configured to determine the address of the target memory based on the created E820H information and acquire memory contents stored in the target memory, if it is detected that a password is set for the operating system; and a second verifying module configured to permit the logon user to log on the operating system in a case that the acquired memory contents are verified as correct.

9. The apparatus for sharing a password between a BIOS and an operating system according to claim 8, wherein the configuration table creating module is configured to, in a case that the received password of the BIOS is verified as correct, store the verified password of the BIOS in the predetermined target memory, store a flag bit corresponding to the verified password of the BIOS in the predetermined target memory, and create the E820H information, wherein the address data in the E820H information points to the address of the target memory; and the memory content acquiring module is configured to, if it is detected that a password is set for the operating system, determine the address of the target memory based on the created E820H information, and acquire the password of the BIOS and the flag bit that are stored in the target memory.

10. A device for sharing a password between a basic input output system (BIOS) and an operating system, comprising:

a memory configured to store programs; and a processor configured to execute the programs to perform operations of:

prompting a logon user to input a password of the BIOS if it is detected in a process of power-on self-test that a password is set for the BIOS;

receiving the password of the BIOS inputted by the logon user, and verifying the received password of the BIOS;

storing the verified password of the BIOS in a predetermined target memory and creating E820H information in a case that the received password of the BIOS is verified as correct, wherein address data in the E820H information points to an address of the target memory;

determining the address of the target memory based on the created E820H information and acquiring memory contents stored in the target memory, if it is detected that a password is set for the operating system; and permitting the logon user to log on the operating system in a case that the acquired memory contents are verified as correct.

11. The device for sharing a password between a BIOS and an operating system according to claim 10, wherein the storing the verified password of the BIOS in a predetermined target memory comprises:

storing the verified password of the BIOS in the predetermined target memory, and storing a flag bit corresponding to the verified password of the BIOS in the predetermined target memory; and the acquiring memory contents stored in the target memory comprises:

acquiring the password of the BIOS and the flag bit that are stored in the target memory.

12. The device for sharing a password between a BIOS and an operating system according to claim 11, wherein the permitting the logon user to log on the operating system in a case that the acquired memory contents are verified as correct comprises:

permitting the logon user to log on the operating system in a case that the acquired flag bit is verified as correct.

13. The device for sharing a password between a BIOS and an operating system according to claim 11, wherein the permitting the logon user to log on the operating system in a case that the acquired memory contents are verified as correct comprises:
  permitting the logon user to log on the operating system in a case that both the acquired password of the BIOS and the acquired flag bit that are stored in the target memory are verified as correct.

14. The device for sharing a password between a BIOS and an operating system according to claim 10, wherein the storing the verified password of the BIOS in a predetermined target memory comprises:
  storing the verified password of the BIOS in the predetermined target memory based on a predetermined data structure; and
  the acquiring memory contents stored in the target memory comprises:
    acquiring the memory contents stored in the target memory by parsing data in the target memory based on the predetermined data structure.

15. The device for sharing a password between a BIOS and an operating system according to claim 10, wherein the determining the address of the target memory based on the created E820H information comprises:
  acquiring the address data in the E820H information by triggering INT15 E820H interrupt, and determining the address of the target memory based on the address data.

16. The device for sharing a password between a BIOS and an operating system according to claim 10, wherein after it is detected that a password is set for the operating system, and before the determining the address of the target memory based on the created E820H information and acquiring memory contents stored in the target memory, the processor is configured to execute the programs to perform the operation of:
  determining whether the password set for the operating system is identical to the password set for the BIOS, wherein the determining the address of the target memory based on the created E820H information and acquiring memory contents stored in the target memory is performed if it is determined that the password set for the operating system is identical to the password set for the BIOS.

* * * * *